US009470258B2

(12) United States Patent
Fitz-Earle et al.

(10) Patent No.: US 9,470,258 B2
(45) Date of Patent: Oct. 18, 2016

(54) CARABINER INCLUDING A LOCK MECHANISM

(71) Applicant: ACCO Brands Corporation, Lake Zurich, IL (US)

(72) Inventors: Bruce Fitz-Earle, Nelson (CA); William De Meulenaere, Newark, CA (US); John Hung, Vancouver (CA)

(73) Assignee: ACCO Brands Corporation, Lake Zurich, IL (US)

( * ) Notice: Subject to any disclaimer, the term of this patent is extended or adjusted under 35 U.S.C. 154(b) by 46 days.

(21) Appl. No.: 14/422,107

(22) PCT Filed: Sep. 9, 2014

(86) PCT No.: PCT/US2014/054689
§ 371 (c)(1),
(2) Date: Feb. 17, 2015

(87) PCT Pub. No.: WO2015/038509
PCT Pub. Date: Mar. 19, 2015

(65) Prior Publication Data
US 2016/0047409 A1 Feb. 18, 2016

Related U.S. Application Data

(60) Provisional application No. 61/875,726, filed on Sep. 10, 2013.

(51) Int. Cl.
F16B 45/02 (2006.01)
(52) U.S. Cl.
CPC .............. F16B 45/02 (2013.01); F16B 45/025 (2013.01)
(58) Field of Classification Search
CPC ................................ F16B 45/02; F16B 45/025
See application file for complete search history.

(56) References Cited

U.S. PATENT DOCUMENTS 25,082 A 8/1859 Pollak
286,253 A 10/1883 Benson
(Continued)

FOREIGN PATENT DOCUMENTS

CN 2713867 8/2005
CN 202456777 10/2012
(Continued)

OTHER PUBLICATIONS

International Search Report and Written Opinion for Application No. PCT/US2014/054689 dated Dec. 29, 2014 (9 pages).
(Continued)

Primary Examiner — Robert J Sandy
Assistant Examiner — David Upchurch
(74) Attorney, Agent, or Firm — Michael Best & Friedrich LLP

(57) ABSTRACT

A carabiner includes a body having a first arm extending from the body and a second arm extending from the body, a first gate pivotally coupled to the body adjacent the first arm for movement relative to the first arm, and a second gate pivotally coupled to the body adjacent the second arm for movement relative to the second arm. The carabiner also includes a blocking member supported by the body. The blocking member is movable between a first position, in which the first and the second gates are movable relative to the first and second arms, a second position, in which the first gate is inhibited from moving relative to the first arm and the second gate is movable relative to the second arm, and a third position, in which the first and the second gates are inhibited from moving relative to the first and second arms.

16 Claims, 9 Drawing Sheets

(56) References Cited

U.S. PATENT DOCUMENTS

| | | | | |
|---|---|---|---|---|
| 582,780 | A | * | 5/1897 | Eldridge ................ F16B 45/02 24/375 |
| 1,504,416 | A | * | 8/1924 | Baude ..................... B60C 27/08 24/577.1 |
| 1,709,235 | A | * | 4/1929 | Shaffer .................. F16B 45/02 24/375 |
| 2,357,478 | A | * | 9/1944 | Koch ..................... F16G 11/14 24/129 R |
| D292,385 | S | | 10/1987 | Udelhofen |
| 5,940,943 | A | | 8/1999 | Kloster |
| 6,415,634 | B2 | | 7/2002 | Luquire |
| 7,249,475 | B2 | | 7/2007 | Yu |
| 7,510,301 | B2 | | 3/2009 | Dial |
| 7,647,677 | B2 | | 1/2010 | Casebolt |
| 8,151,419 | B2 | * | 4/2012 | Rolain ................. A01K 27/006 24/370 |
| D669,764 | S | | 10/2012 | Kelleghan |
| D698,626 | S | * | 2/2014 | Ormsbee ........................ D8/356 |
| 2005/0085210 | A1 | * | 4/2005 | Leung ................... F16B 45/02 455/344 |
| 2009/0000086 | A1 | | 1/2009 | Bing |
| 2009/0008188 | A1 | | 1/2009 | Bronnaz et al. |
| 2010/0306974 | A1 | | 12/2010 | Munoz |
| 2010/0314196 | A1 | * | 12/2010 | De Boeck .......... A62B 35/0087 182/3 |
| 2010/0314479 | A1 | * | 12/2010 | Kish ................. B65H 75/4434 242/376 |
| 2011/0031065 | A1 | * | 2/2011 | Strasser ............. A62B 35/0087 182/3 |
| 2011/0047764 | A1 | * | 3/2011 | Strasser ................ F16B 45/025 24/599.5 |
| 2013/0105527 | A1 | * | 5/2013 | Rekuc .................... A45C 15/00 224/183 |
| 2013/0232741 | A1 | | 9/2013 | Liang |
| 2013/0299540 | A1 | * | 11/2013 | Avganim ............... A45C 13/18 224/600 |
| 2014/0150502 | A1 | | 6/2014 | Duncan |
| 2015/0337887 | A1 | * | 11/2015 | Ormsbee ................ F16M 13/02 24/485 |

FOREIGN PATENT DOCUMENTS

| | | |
|---|---|---|
| DE | 2405097 | 11/1974 |
| DE | 202014003786 | 5/2014 |
| ES | 1034639 | 1/1997 |

OTHER PUBLICATIONS

Locking S-Biner, NITE IZE, Retrieved from the Internet on Jul. 3, 2014 <URL: http://www.zoro.com/g/00152259/k-G5239421?utm_source=google_shopping&utm_medium=cpc&utm_campaign=Google_Shopping_Feed&gclid=CJ_Vjaz1qb8CFQwGaQod31gAMg>.

S-Biner SlideLock, NITE IZE, Retrieved from the Internet on Jan. 16, 2013 <URL: http://www.niteize.com/product/S-Biner-SlideLock.asp>.

"S" shaped Carabiner, Stussy 30th Anniversary Carabiner, Stussy, Feb. 23, 2010, Retrieved from the Internet on Jul. 3, 2014 <URL: http://hypebeast.com/201012/stussy-30th-anniversary-carabiner>.

* cited by examiner

CARABINER INCLUDING A LOCK MECHANISM

CROSS-REFERENCE TO RELATED APPLICATIONS

This application claims priority to U.S. Provisional Patent Application No. 61/875,726, filed Sep. 10, 2013, the entire contents of which are hereby incorporated by reference.

BACKGROUND

The present invention relates to carabiners and, more particularly, to carabiners including lock mechanisms.

Carabiners are used in many applications (e.g., climbing, sailing, construction, etc.) to hold two or more ropes, cables, or other objects together. Carabiners can be used in various applications that are braking-force-dependent such as, for example, carrying live loads, lifting loads, or moving/halting dynamic (e.g., falling) loads. Carabiners can also be used in non-load bearing applications. Carabiner-style key rings have recently also become popular.

SUMMARY

In one embodiment, the invention provides a carabiner including a body having a first arm extending from the body and a second arm extending from the body, a first gate pivotally coupled to the body adjacent the first arm for movement relative to the first arm, and a second gate pivotally coupled to the body adjacent the second arm for movement relative to the second arm. The carabiner also includes a blocking member supported by the body. The blocking member is movable between a first position, in which the first and the second gates are movable relative to the first and second arms, a second position, in which the first gate is inhibited from moving relative to the first arm and the second gate is movable relative to the second arm, and a third position, in which the first and the second gates are inhibited from moving relative to the first and second arms.

In another embodiment, the invention provides a carabiner including a body having an arm extending from the body, a gate pivotally coupled to the body adjacent the arm for movement relative to the arm, and a lock mechanism supported by the body. The lock mechanism includes a tubular lock configured to receive a key, and a member coupled to the tubular lock. The tubular lock is actuatable by the key to move the member between a first position, in which the gate is movable relative to the arm, and a second position, in which the gate is inhibited from moving relative to the arm.

In yet another embodiment, the invention provides a carabiner including a body having central portion, a first arm extending from the central portion, and a second arm extending from the central portion in a substantially opposite direction than the first arm. The carabiner also includes a first gate pivotally coupled to the central portion adjacent the first arm for movement relative to the first arm, a second gate pivotally coupled to the central portion adjacent the second arm for movement relative to the second arm, and a lock mechanism supported by the central portion of the body. The lock mechanism includes a tubular lock configured to receive a key, and a blocking member coupled to the tubular lock. The tubular lock is actuatable by the key to move the blocking member between a first position, in which the first and the second gates are movable relative to the first and second arms, a second position, in which the first gate is inhibited from moving relative to the first arm and the second gate is movable relative to the second arm, and a third position, in which the first and the second gates are inhibited from moving relative to the first and second arms.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
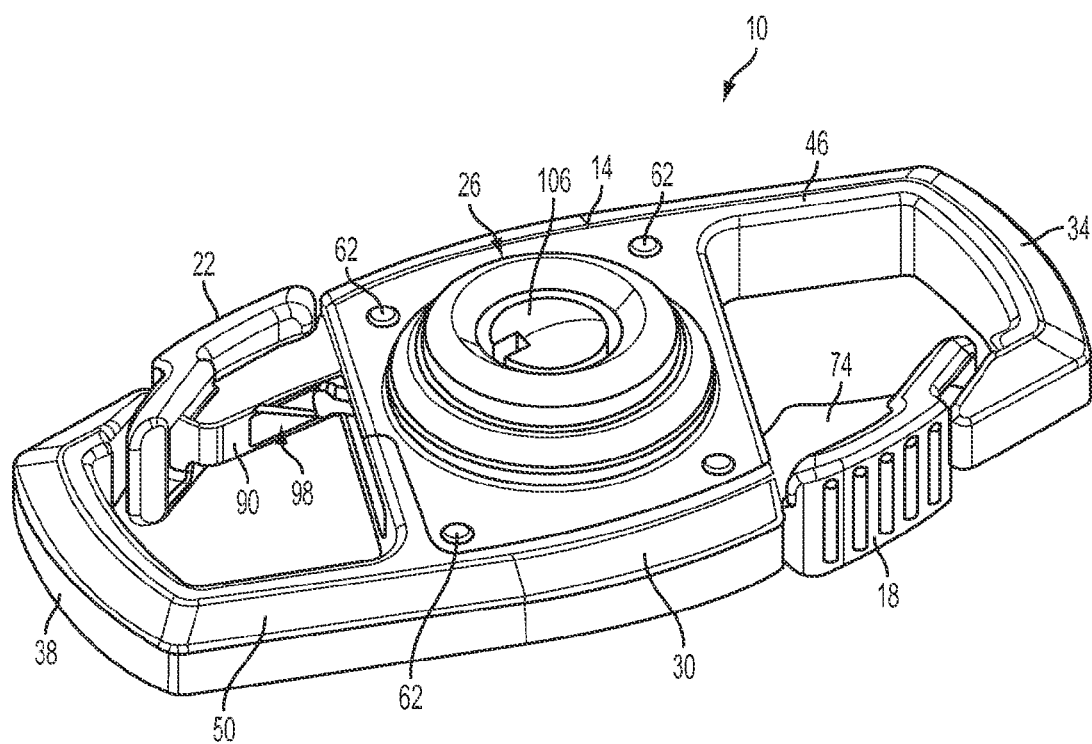
FIG. 1 is a perspective view of a carabiner including a lock mechanism.

FIG. 1 illustrates a carabiner 10. In the illustrated embodiment, the carabiner 10 is a lockable carabiner that can secure two or more cables, ropes, or other objects together. For example, in some embodiments, the carabiner 10 can be attached to a first security cable that is secured to a laptop computer (or other electronic device) and to a second security cable that is secured to an immovable object (e.g., a desk, a table, a wall, etc.) to secure the laptop computer in place. In other embodiments, the carabiner 10 may be used in other applications, such as sports or outdoor activities.

The illustrated carabiner 10 includes a main body 14, a first gate 18, a second gate 22, and a lock mechanism 26. The main body 14 includes a central portion 30, a first arm 34 extending from the central portion 30, and a second arm 38 extending from the central portion 30. The central portion 30, or hub, is positioned between the first and second arms 34, 38. The central portion 30 defines an opening or passage 42 (FIG. 2) for receiving and supporting the lock mechanism 26. The first arm 34 and the second arm 38 extend in substantially opposite directions from the central portion 30. In the illustrated embodiment, the first and second arms 34, 38 are generally hook-shaped. In other embodiments, the arms 34, 38 may have other shapes or configurations.

Figure 2:
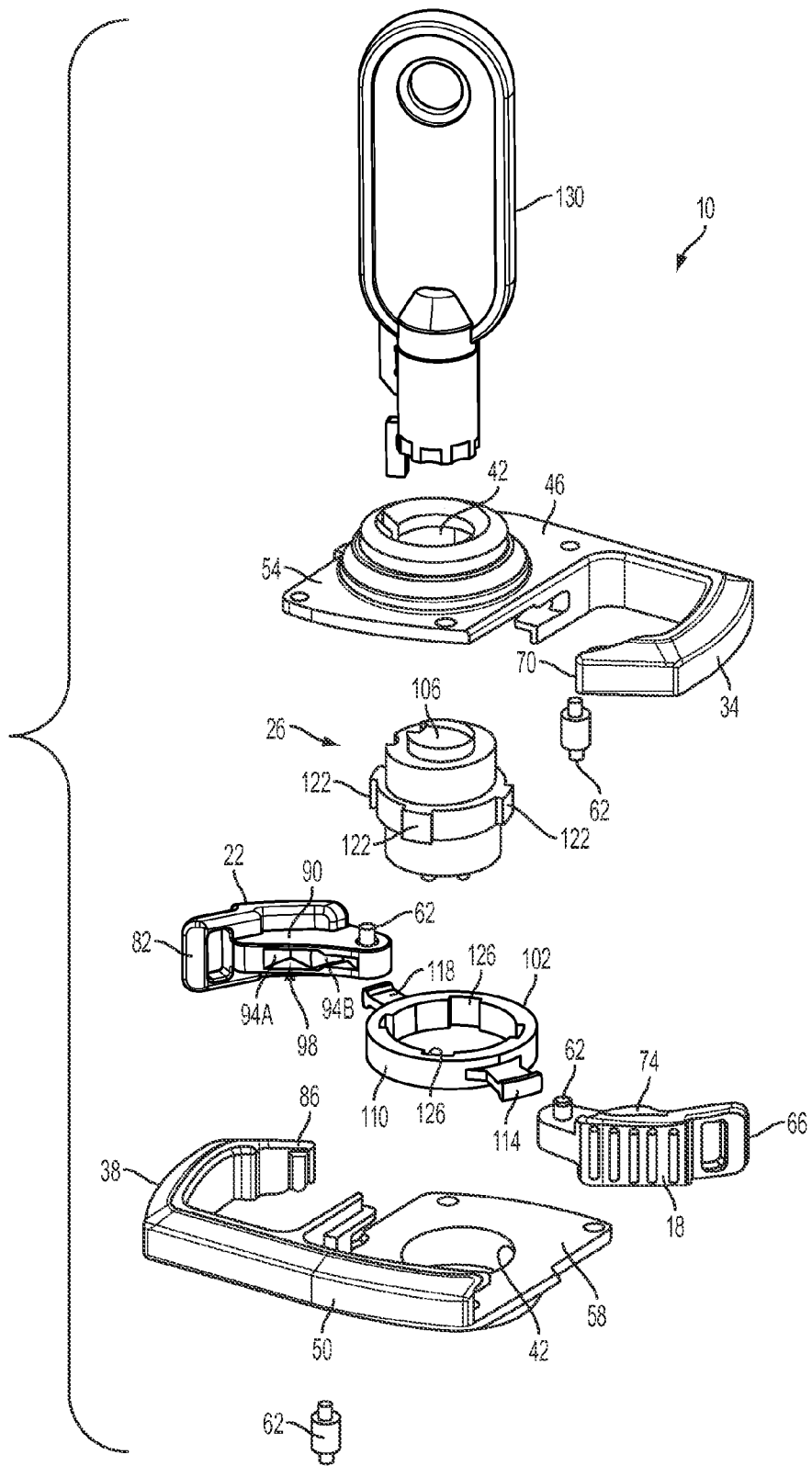
FIG. 2 is an exploded perspective view of the carabiner of FIG. 1.

As shown in FIG. 2, the main body 14 is formed by a first body portion 46 and a second body portion 50. The first portion 46 includes a central section 54 that defines part of the opening 42 for receiving and supporting the lock mechanism 26. The first arm 34 is integrally formed with the central section 54 as a single piece and extends outwardly from the central section 54. The second portion 50 includes a central section 58 that also defines part of the opening 42 for receiving and supporting the lock mechanism 26. The second arm 38 is integrally formed with the central section 58 as a single piece and extends outwardly from the central section 58.

The first and second body portions 46, 50 are coupled together to form the central portion 30 of the body 14. In addition, the first and second body portions 46, 50 are coupled together such that the openings in the central sections 54, 58 align to form the opening 42 through the central portion 30. The lock mechanism 26 is captured between the central sections 54, 58 so that the lock mechanism 26 is secured within the opening 42 and supported by the central portion 30 of the body 14. In the illustrated embodiment, the first and second body portions 46, 50 are secured together by fasteners 62 (e.g., rivets, pins, etc.). In other embodiments, the body portions 46, 50 may also or alternatively be secured together by welding or adhesives.

Figure 3:
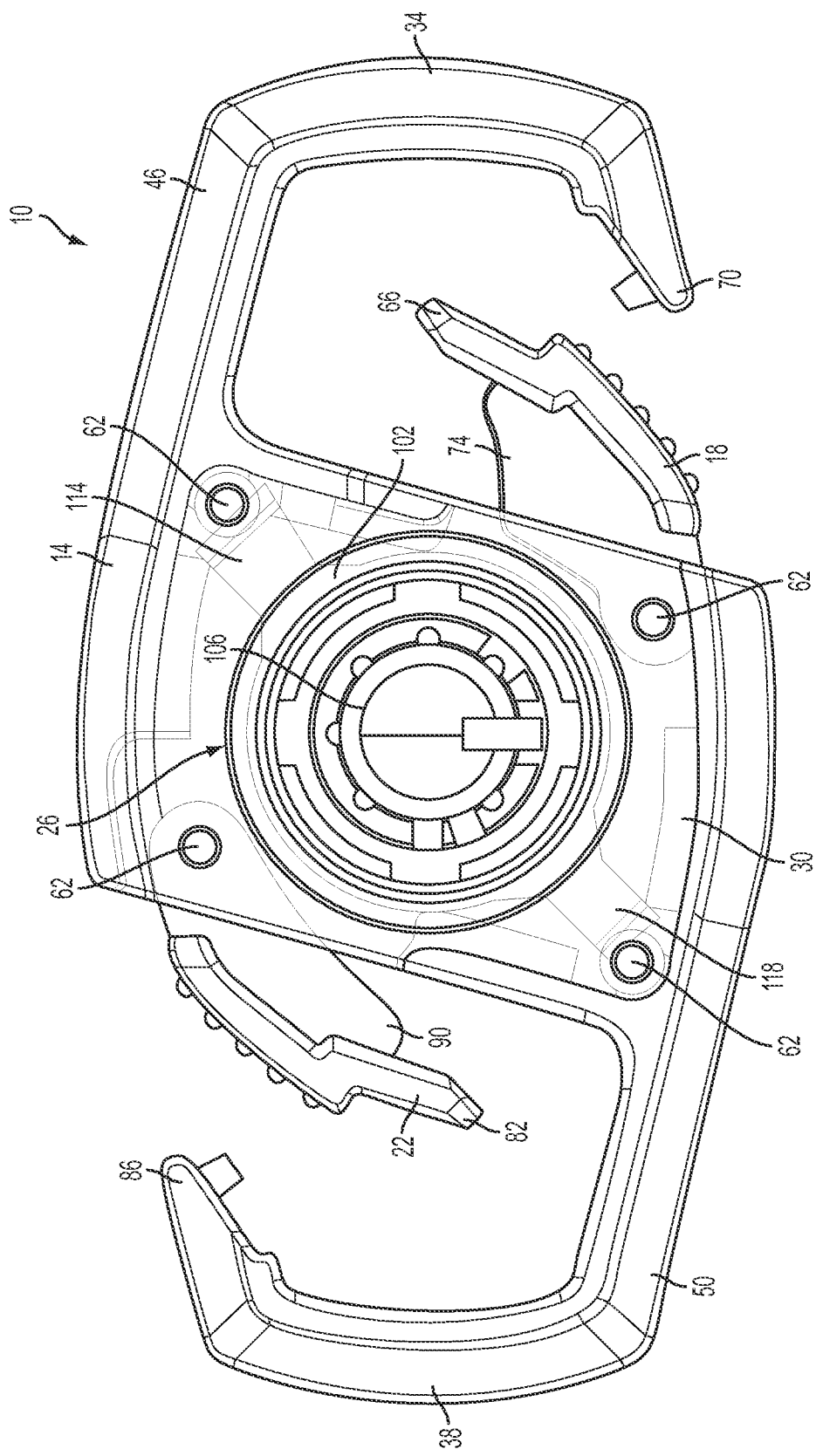
FIG. 3 is a top, partially-transparent view of the carabiner of FIG. 1 with the lock mechanism in a first position.
Figure 4:
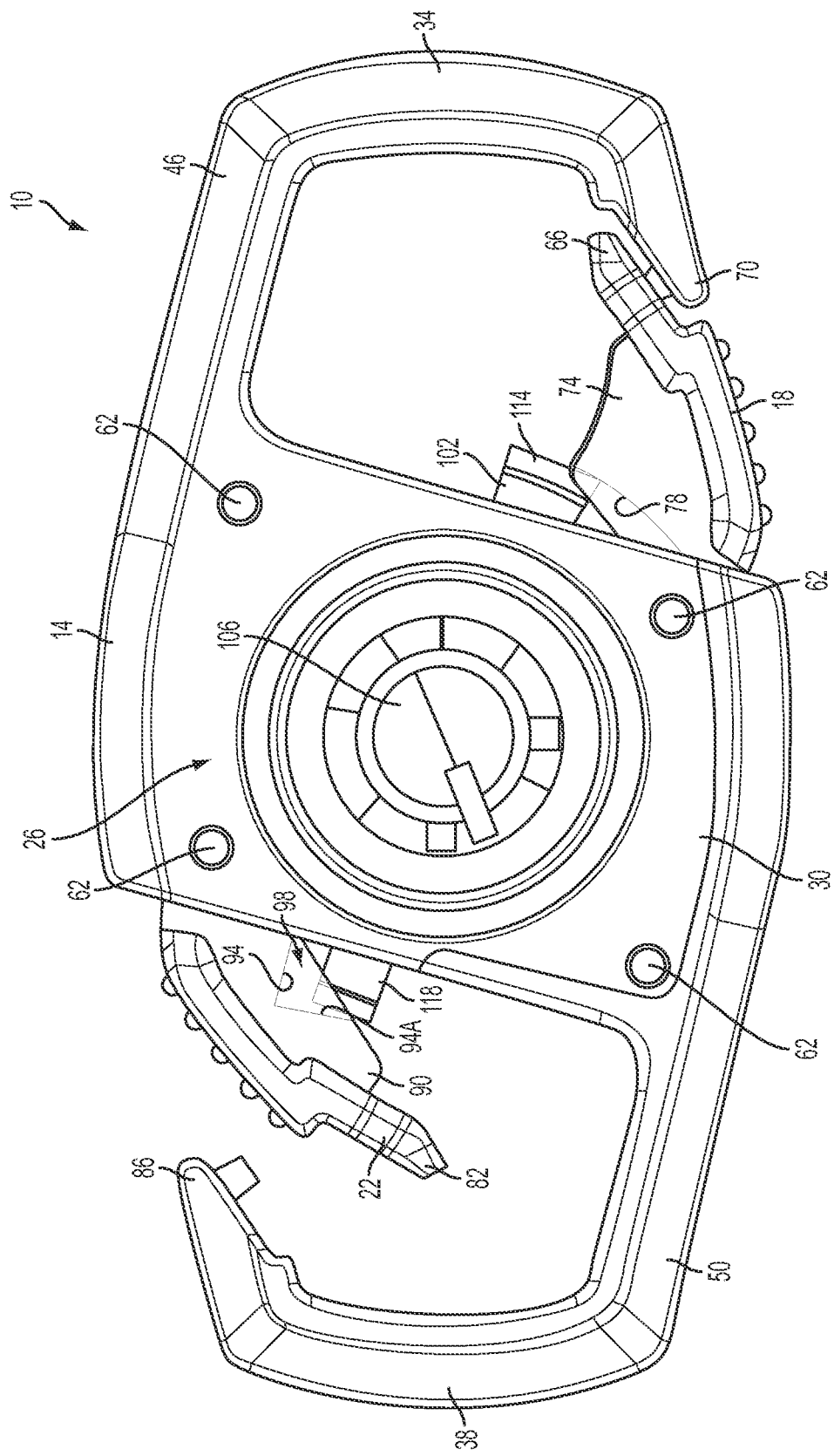
FIG. 4 is a top, partially-transparent view of the carabiner of FIG. 1 with the lock mechanism in a second position.
Figure 5:
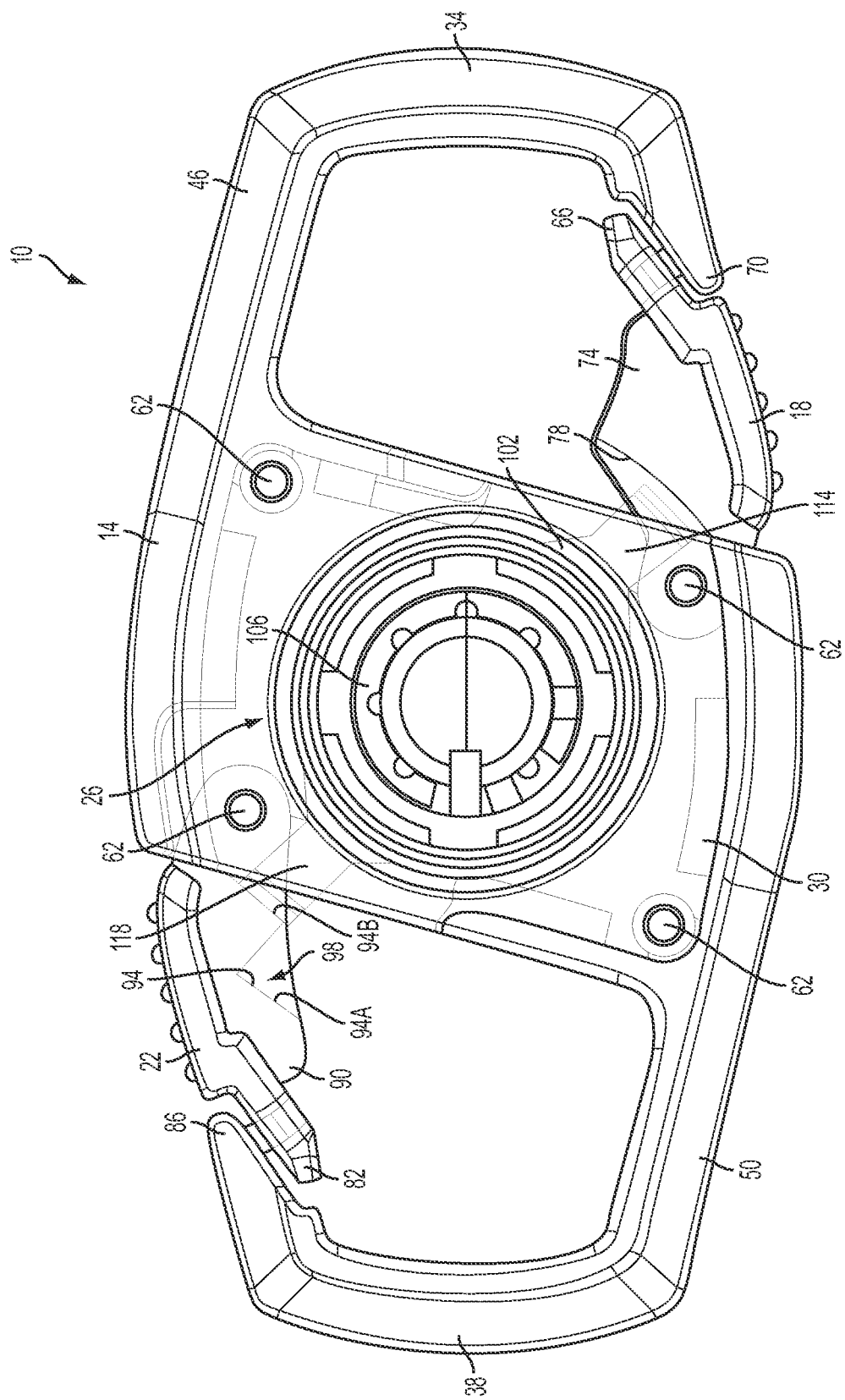
FIG. 5 is a top, partially-transparent view of the carabiner of FIG. 1 with the lock mechanism in a third position.

As shown in FIGS. 3-5, the first gate 18 is pivotally coupled to the central portion 30 of the body 14 adjacent the first arm 34. In the illustrated embodiment, the first gate 18 is pivotally coupled about one of the fasteners 62. The first gate 18 is movable (e.g., pivotable) relative to the first arm 34 between an open position (FIG. 3) and a closed position (FIGS. 4 and 5). When in the closed position, the first gate 18, the first arm 34, and the central portion 30 form a continuous, closed loop. When in the open position, a free or distal end 66 of the first gate 18 is spaced apart from a free or distal end 70 of the first arm 34 so that a gap exists between the gate 18 and the arm 34.

The illustrated first gate 18 includes a locking element 74 having an inner surface 78 that interacts with the lock mechanism 26. In particular, the inner surface 78 is selectively engaged by the lock mechanism 26 to inhibit or allow movement of the first gate 18 relative to the first arm 34. In the illustrated embodiment, the locking element 74 is a protrusion formed on an inner portion of the first gate 18. The first gate 18 is pivotally movable relative to the first arm 34 when the lock mechanism 26 does not engage (e.g., is spaced apart from) the locking element 74, as shown in FIG. 3. The first gate 18 is inhibited from moving relative to the first arm 34 when the lock mechanism 26 engages (e.g., directly contacts or abuts) the locking element 74, as shown in FIGS. 4 and 5.

The second gate 22 is pivotally coupled to the central portion 30 of the body 14 adjacent the second arm 38. In the illustrated embodiment, the second gate 22 is pivotally coupled about one of the fasteners 62. The second gate 22 is movable (e.g., pivotable) relative to the second arm 38 between an open position (FIGS. 3 and 4) and a closed position (FIG. 5). When in the closed position, the second gate 22, the second arm 38, and the central portion 30 form a continuous, closed loop. When in the open position, a free or distal end 82 of the second gate 22 is spaced apart from a free or distal end 86 of the second arm 38 so that a gap exists between the gate 22 and the arm 38.

The illustrated second gate 22 includes a locking element 90 having an inner surface 94 that interacts with the lock mechanism 26. In particular, the inner surface 94 is selectively engaged by the lock mechanism 26 to inhibit or allow movement of the second gate 22 relative to the second arm 38. In the illustrated embodiment, the locking element 90 is a protrusion formed on an inner portion of the second gate 22. In comparison to the inner surface 78 of the first gate 18, however, the inner surface 94 of the second gate 22 defines a cutout or recess 98 such that the inner surface 94 has a stepped profile (shown in FIGS. 4 and 5). A radial distance between a first portion 94A of the inner surface 94 and the lock mechanism 26, thereby, is greater than a radial distance between a second portion 94B of the inner surface 94 and the lock mechanism 26. The recess 98 provides clearance for a portion of the lock mechanism 26 so that the second gate 22 is at least partially movable even when the first gate 18 is inhibited from moving. For example, the second gate 22 is pivotable relative to the second arm 38 when the lock mechanism 26 does not engage (e.g., is spaced apart from) the locking element 90, as shown in FIG. 3. The second gate 22 is at least partially pivotable relative to the second arm 38 when the lock mechanism 26 is received in the recess 98 of the locking element 90, as shown in FIG. 4. The second gate 22 is inhibited from moving when the lock mechanism 26 engages (e.g., directly contacts or abuts) the second inner surface portion 94B of the locking element 90, as shown in FIG. 5.

In some embodiments, the carabiner 10 includes biasing members coupled between the gates 18, 22 and the body 14 to bias the first gate 18 and the second gate 22 toward the closed positions. In such embodiments, the gates 18, 22 automatically close unless pressed inward by a user. The biasing members may be, for example, torsion springs positioned around corresponding fasteners 62. Alternatively, the biasing members may be leaf springs or coil springs.

As shown in FIG. 2, the illustrated lock mechanism 26 includes a blocking member 102 and a tubular lock 106. The blocking member 102 is supported by the central portion 30 of the main body 14. In the illustrated embodiment, the blocking member 102 is captured between the first and second body sections 46, 50 so that the blocking member 102 is positioned substantially within the body 14. The illustrated blocking member 102 includes an annular disk 110 and two fingers 114, 118. The annular disk 110 surrounds a portion of the tubular lock 106. The fingers 114, 118 extend radially outward from the annular disk 110 in substantially opposite directions. In particular, the first finger 114 extends from the annular disk 110 generally toward the first gate 18, and the second finger 118 extends from the annular disk generally toward the second gate 22. In the illustrated embodiment, the first finger 114 is larger (e.g., wider) than the second finger 118. Making the first finger 114 relatively larger helps the first finger 114 maintain contact with the inner surface 78 of the first gate 18 when the blocking member 102 is in the position shown in FIG. 4.

The tubular lock 106 is secured to the annular disk 110 such that rotating the lock 106 rotates the blocking member 102. In the illustrated embodiment, the tubular lock 106 includes ribs 122, and the annular disk 110 includes corresponding recesses 126 that receive the ribs 122 to fix the disk 110 to the lock 106. In other embodiments, the annular disk 110 may be press-fit, glued, or otherwise secured to the tubular lock 106. The illustrated tubular lock 106 is configured to receive a key 130. When the key 130 is inserted into the lock 106 and turned, the lock 106 is actuated (e.g., rotated) to rotate the blocking member 102 relative to the body 14. In other embodiments, other suitable locks may also or alternatively be employed.

As shown in FIGS. 3-5, the blocking member 102, and thereby the fingers 114, 118, is movable between three discrete positions by actuating (e.g., rotating) the tubular lock 106. In the first position (FIG. 3), the first finger 114 does not engage (i.e., is spaced apart from) the locking element 74 of the first gate 18, and the second finger 118 does not engage (i.e., is spaced apart from) the locking element 90 of the second gate 22. In this position, both the first and second gates 18, 22 are movable relative to the first and second arms 34, 38, respectively. In addition, the fingers 114, 118 are positioned entirely within a volume defined by the central portion 30 of the body 14. Such an arrangement reduces the possibility of the fingers 114, 118 becoming snagged or damaged when inserting objects (e.g., cables) into the loops formed by the gates 18, 22 and the arms 34, 38.

In the second position (FIG. 4), the first finger 114 engages (e.g., abuts) the inner surface 78 of the locking element 74 of the first gate 18 so that the first gate 18 is inhibited from moving relative to the first arm 34. The second finger 118, however, is received in the recess 98 of the locking element 90 of the second gate 22 so that the second gate 22 is at least partially pivotable relative to the second arm 38. This position allows a user to insert an object into or remove an object from the closed loop of the second gate 22 and the second arm 38, while maintaining the security created by the closed loop of the first gate 18 and the first arm 34. In the illustrated embodiment, both the first finger 114 and the second finger 118 extend outwardly from the volume defined by the central portion 30 of the body 14 while in the second position. In other embodiments, only the first finger 114 may extend outwardly from the volume defined by the central portion while in the second position.

In the third position (FIG. 5), the first finger 114 engages (e.g., abuts) the inner surface 78 of the locking element 74 of the first gate 18, and the second finger 118 engages (e.g., abuts) the second portion 94B of the inner surface 94 of the locking element 90 of the second gate 22. In this position, both the first gate 18 and the second gate 22 are inhibited from moving relative to the first and second arms 34, 38, respectively. This position locks the carabiner 10, and any objects received in the closed loops, in place.

In some scenarios, the carabiner 10 is usable to secure an electronic device (e.g., a laptop computer) to an immovable object (e.g., a desk, a wall, a table, a cabinet, etc.). A user first inserts the key 130 into the tubular lock 106 to rotate the lock 106 and the blocking member 102 to the first position (FIG. 3) so that both the first gate 18 and the second gate 22 are movable. A first security cable is then inserted into the loop between the first gate 18 and the first arm 34, and a second security cable is then inserted into the loop between the second gate 22 and the second arm 38. The first security cable is connected to the immovable object. The second security cable is attached to a security device for the electronic device. In other embodiments, the first cable may be connected to the security device of the electronic device, and the second security cable may be connected to the immovable object.

To lock the electronic device to the immovable object, the user turns the key 130 in the tubular lock 106 to rotate the lock 106 and the blocking member 102 to the third position (FIG. 5) so that both the first gate 18 and the second gate 22 are inhibited from moving relative to the first and second arms 34, 38, respectively. The user then removes the key 130 from the lock 106. The security cables, therefore, cannot be removed from the closed loops formed by the gates 18, 22 and the arms 34, 38.

To disconnect the electronic device from the immovable object, the user inserts the key 130 into the tubular lock 106 to rotate the lock 106 and the blocking member 102 back to the first position (FIG. 1). The first security cable and the second security cable can then both be removed from the carabiner 10, and the electronic device can be taken away from the immovable object.

Alternatively, the lock 106 and the blocking member 102 can be rotated to the second position (FIG. 4) rather than the first position (FIG. 3). In this position, the second security cable can be removed from the carabiner 10 so that the electronic device can be taken away from the immovable object. The first security cable, however, remains secured within the closed loop of the first gate 18 and the first arm 34 so that the carabiner 10 cannot be disconnected from the immovable object.

Figure 6:
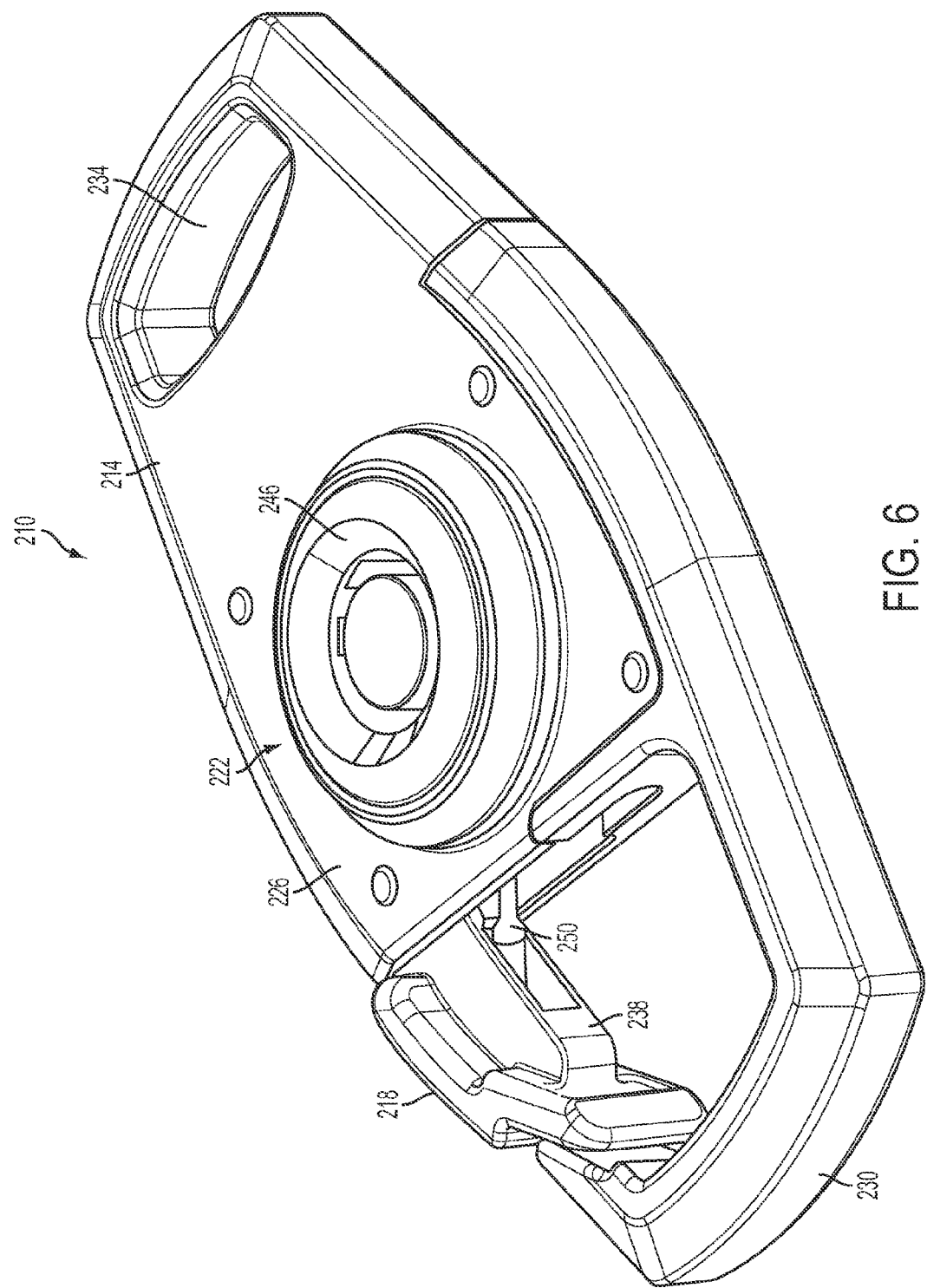
FIG. 6 is a perspective view of another carabiner including a lock mechanism.
Figure 7:
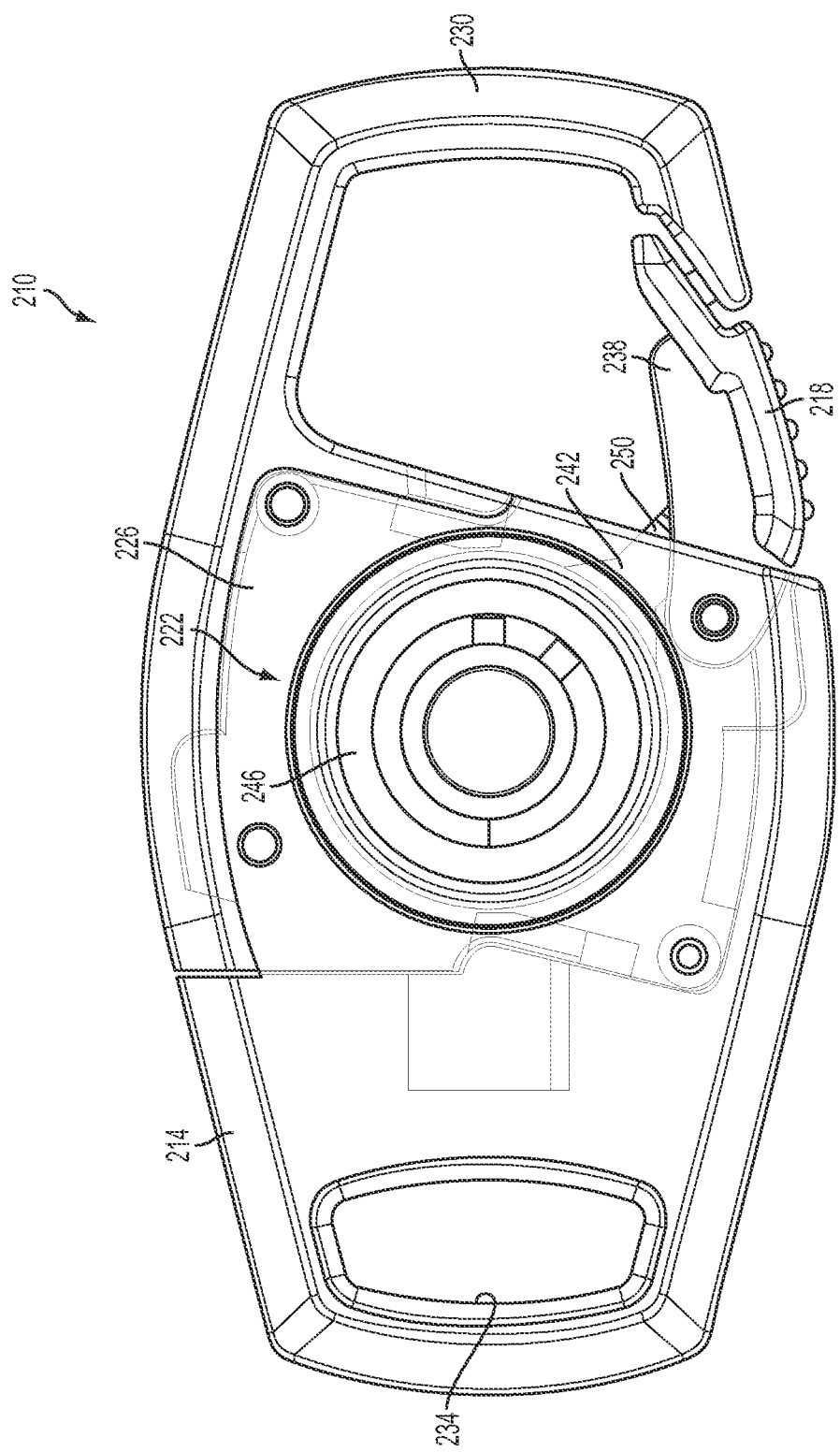
FIG. 7 is a top, partially-transparent view of the carabiner of FIG. 6 with the lock mechanism in a first position.
Figure 8:
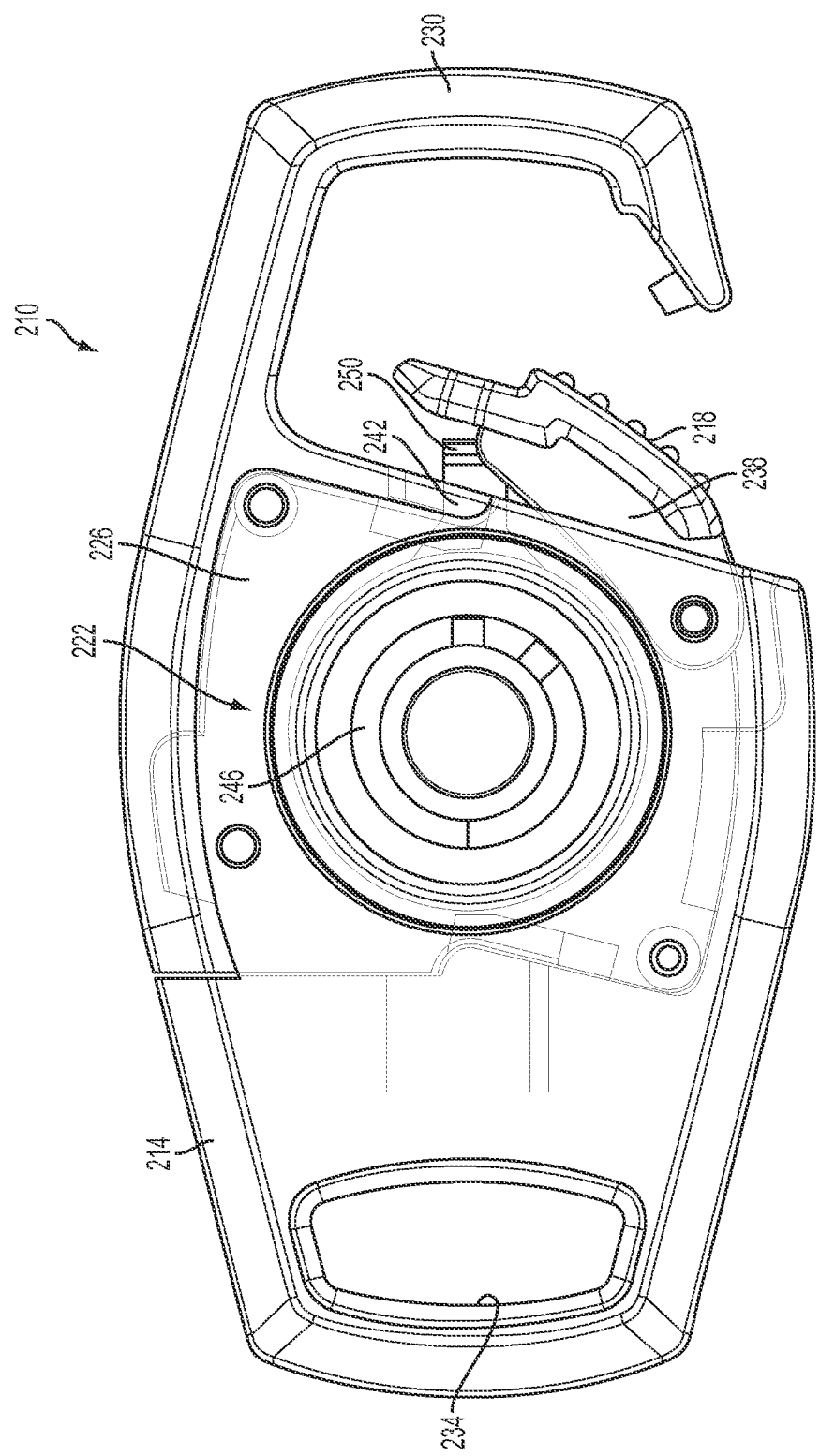
FIG. 8 is a top, partially-transparent view of the carabiner of FIG. 6 with the lock mechanism in a second position.

FIGS. 6-8 illustrate another carabiner 210. The carabiner 210 is similar to the carabiner 10 discussed above. Reference is hereby made to the description of the carabiner 10 for discussion of features and elements of the carabiner 210 not specifically described below.

The illustrated carabiner 210 includes a main body 214, a gate 218, and a lock mechanism 222. The body 214 includes a base portion 226 and an arm 230 extending from the base portion 226. Unlike the carabiner 10, the illustrated carabiner 210 only includes one arm 230. In the illustrated embodiment, the base portion 226 defines an aperture 234. The illustrated aperture 234 is a slot formed adjacent an end of the base portion 226 opposite from the arm 230. In some embodiments, the aperture 234 is used to hang the carabiner 210 from a strap, rope, clip, and the like of, for example, a bag or backpack. In other embodiments, the aperture 234 may receive a cable or chain to more permanently secure the carabiner 210 to an external object.

The gate 218 is pivotally coupled to the base portion 226 of the body 214 adjacent the arm 230. The gate 218 is movable relative to the arm 230 between an open position (FIG. 8) and a closed position (FIG. 7). Similar to the gates 18, 22 discussed above, the illustrated gate 218 includes a locking element 238. The gate 218 is movable relative to the arm 230 when the lock mechanism 222 does not engage the locking element 238. The gate 218 is inhibited from moving relative to the arm 230 when the lock mechanism 222 engages the locking element 238. In some embodiments, a biasing member may be coupled to the gate 218 to bias the gate 218 toward the closed position.

Similar to the lock mechanism 26 discussed above, the illustrated lock mechanism 222 includes a blocking member 242 and a tubular lock 246. In the illustrated embodiment, the blocking member 242 only includes one finger 250 that selectively engages the gate 218. The finger 250 does not engage the locking element 238 of the gate 218 when the lock mechanism 222 is in a first position (FIG. 8) to allow movement of the gate 218 relative to the arm 230. The finger 250 engages the locking element 238 of the gate 218 when the lock mechanism 222 is in a second position (FIG. 7) to inhibit movement of the gate 218 relative to the arm 230.

Other operations of the carabiner 210 are substantially the same as the operations of the carabiner 10 discussed above with reference to FIGS. 1-5.

Figure 9:
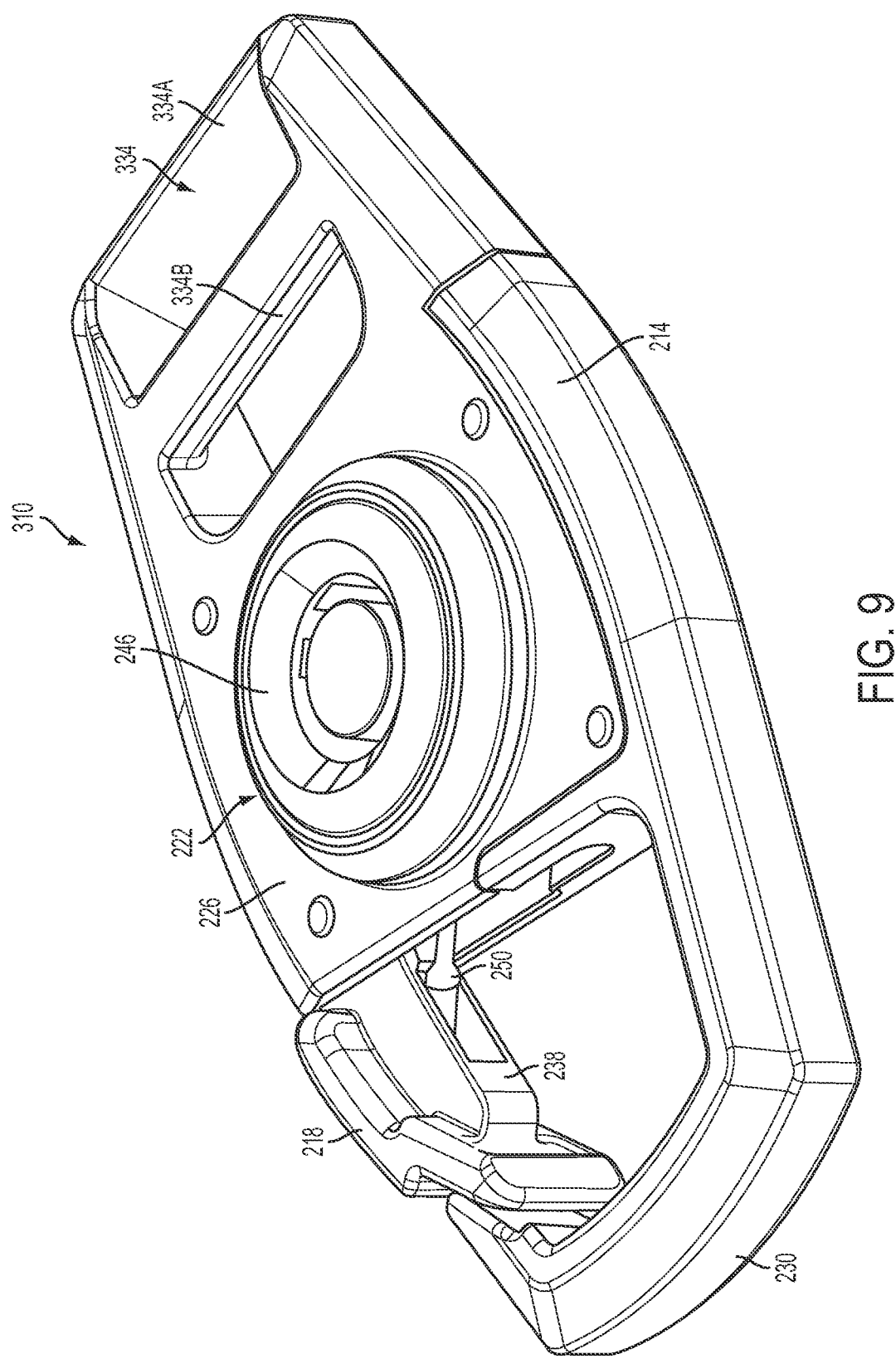
FIG. 9 is a perspective view of another carabiner including a lock mechanism.

FIG. 9 illustrates another carabiner 310. The carabiner 310 includes similar components as the carabiner 210 shown in FIGS. 6-8, and like parts have been give the same reference numbers.

In the illustrated embodiment, the base portion 226 of the body 214 defines a double aperture 334 including a first slot 334A and a second slot 334B. The first and second slots 334A, 334B are configured to secure an adjustable strap to the body 214. In some embodiments, the strap can be part of a backpack, a bag, an article of clothing, and the like. The strap can loop through the first and second apertures 334A, 334B to adjustably secure the strap to the carabiner 310.

Although the carabiners 10, 210, 310 have been described with reference to securing a portable electronic device to an immovable object, in other embodiments, the carabiners 10, 210, 310 may be used in different applications to secure together different types of objects. For example, the carabiners 10, 120, 310 may be scaled for use in commercial, industrial, or other high-strength applications to secure chains, heavy equipment, and the like.

Various features and advantages of the invention are set forth in the following claims.

What is claimed is:

1. A carabiner comprising:
a body including a first arm extending from the body and a second arm extending from the body;
a first gate pivotally coupled to the body adjacent the first arm for movement relative to the first arm;
a second gate pivotally coupled to the body adjacent the second arm for movement relative to the second arm; and
a blocking member supported by the body, the blocking member movable between a first position, in which the first and the second gates are movable relative to the first and second arms, a second position, in which the first gate is inhibited from moving relative to the first arm and the second gate is movable relative to the second arm, and a third position, in which the first and the second gates are inhibited from moving relative to the first and second arms.

2. The carabiner of claim 1, wherein the blocking member is rotatable between the first, second, and third positions.

3. The carabiner of claim 1, wherein the body includes a central portion located between the first and second arms.

4. The carabiner of claim 3, wherein the blocking member is supported by the central portion of the body.

5. The carabiner of claim 3, wherein the first and second arms extend in substantially opposite directions from the central portion of the body.

6. The carabiner of claim 1, wherein the blocking member includes a first finger and a second finger, wherein the first finger selectively engages the first gate to inhibit movement of the first gate, and wherein the second finger selectively engages the second gate to inhibit movement of the second gate.

7. The carabiner of claim 6, wherein each of the first and second gates includes an inner surface, and wherein the first finger and the second finger selectively engage the inner surface of the first gate and the inner surface of the second gate, respectively, to inhibit movement of the first and second gates.

8. The carabiner of claim 7, wherein the inner surface of the second gate includes a recess that provides clearance for the second finger when the blocking member is in the second position.

9. The carabiner of claim 1, wherein the blocking member is positioned within a volume defined by the body when in the first position, and wherein portions of the blocking member extend outwardly from the volume defined by the body when in the second and third positions.

10. The carabiner of claim 1, further comprising a lock mechanism coupled to the blocking member, wherein the lock mechanism is actuatable to move the blocking member between the first, second, and third positions.

11. The carabiner of claim 10, wherein the lock mechanism includes a tubular lock that is configured to receive a key, and wherein the tubular lock is actuatable by the key to move the blocking member between the first, second, and third positions.

12. A carabiner comprising:
a body including central portion, a first arm extending from the central portion, and a second arm extending from the central portion in a substantially opposite direction than the first arm;
a first gate pivotally coupled to the central portion adjacent the first arm for movement relative to the first arm;
a second gate pivotally coupled to the central portion adjacent the second arm for movement relative to the second arm; and
a lock mechanism supported by the central portion of the body, the lock mechanism including a tubular lock configured to receive a key, and a blocking member coupled to the tubular lock, the tubular lock being actuatable by the key to move the blocking member between a first position, in which the first and the second gates are movable relative to the first and second arms, a second position, in which the first gate is inhibited from moving relative to the first arm and the second gate is movable relative to the second arm, and a third position, in which the first and the second gates are inhibited from moving relative to the first and second arms.

13. The carabiner of claim 12, wherein the blocking member is rotatable between the first, second, and third positions.

14. The carabiner of claim 12, wherein the blocking member includes a first finger and a second finger, wherein the first finger selectively engages an inner surface of the first gate to inhibit movement of the first gate, and wherein the second finger selectively engages an inner surface of the second gate to inhibit movement of the second gate.

15. The carabiner of claim 14, wherein the inner surface of the second gate includes a recess that provides clearance for the second finger when the blocking member is in the second position.

16. The carabiner of claim 12, wherein the blocking member is positioned within a volume defined by the central portion of the body when in the first position, and wherein portions of the blocking member extend outwardly from the volume defined by central portion of the body when in the second and third positions.

* * * * *